United States Patent [19]
Evans

[11] Patent Number: 5,910,766
[45] Date of Patent: Jun. 8, 1999

[54] VEHICULAR ACCIDENT LOCATOR AND IDENTIFICATION SYSTEM

[76] Inventor: Stephen M. Evans, 5238 Mountain Village Ct., Stone Mountain, Ga. 30083

[21] Appl. No.: 08/985,169

[22] Filed: Dec. 4, 1997

[51] Int. Cl.⁶ ...................................................... G08B 1/08
[52] U.S. Cl. ......................... 340/539; 340/590; 340/429; 200/61.08; 200/61.18
[58] Field of Search ..................................... 340/539, 590, 340/429; 200/61.08, 61.18

[56] References Cited

U.S. PATENT DOCUMENTS

| | | | |
|---|---|---|---|
| 4,670,739 | 6/1987 | Kell, Jr. ................................... | 340/539 |
| 4,918,425 | 4/1990 | Greenberg et al. ..................... | 340/539 |
| 4,982,664 | 1/1991 | Norton ................................... | 180/282 |
| 5,378,864 | 1/1995 | Olivier et al. ........................ | 200/61.08 |

*Primary Examiner*—Donnie L. Crosland

[57] ABSTRACT

A vehicular accident locator system is provided including a plurality of sensor assemblies each including a brittle conductive element. The sensor assemblies are mounted throughout the body and the elements thereof are connected in series via insulated wires. As such, an activation signal is transmitted upon the breaking of any one of the elements by way of an accident. A transmitter housing has a transmitter connected to the elements of the sensor assemblies for transmitting a coded signal upon receipt of the activation signal. Finally, a receiver base is positioned distant the vehicle and adapted to receive the coded signal to triangulate the exact location of the vehicle such that an emergency vehicle may be dispatched.

3 Claims, 3 Drawing Sheets

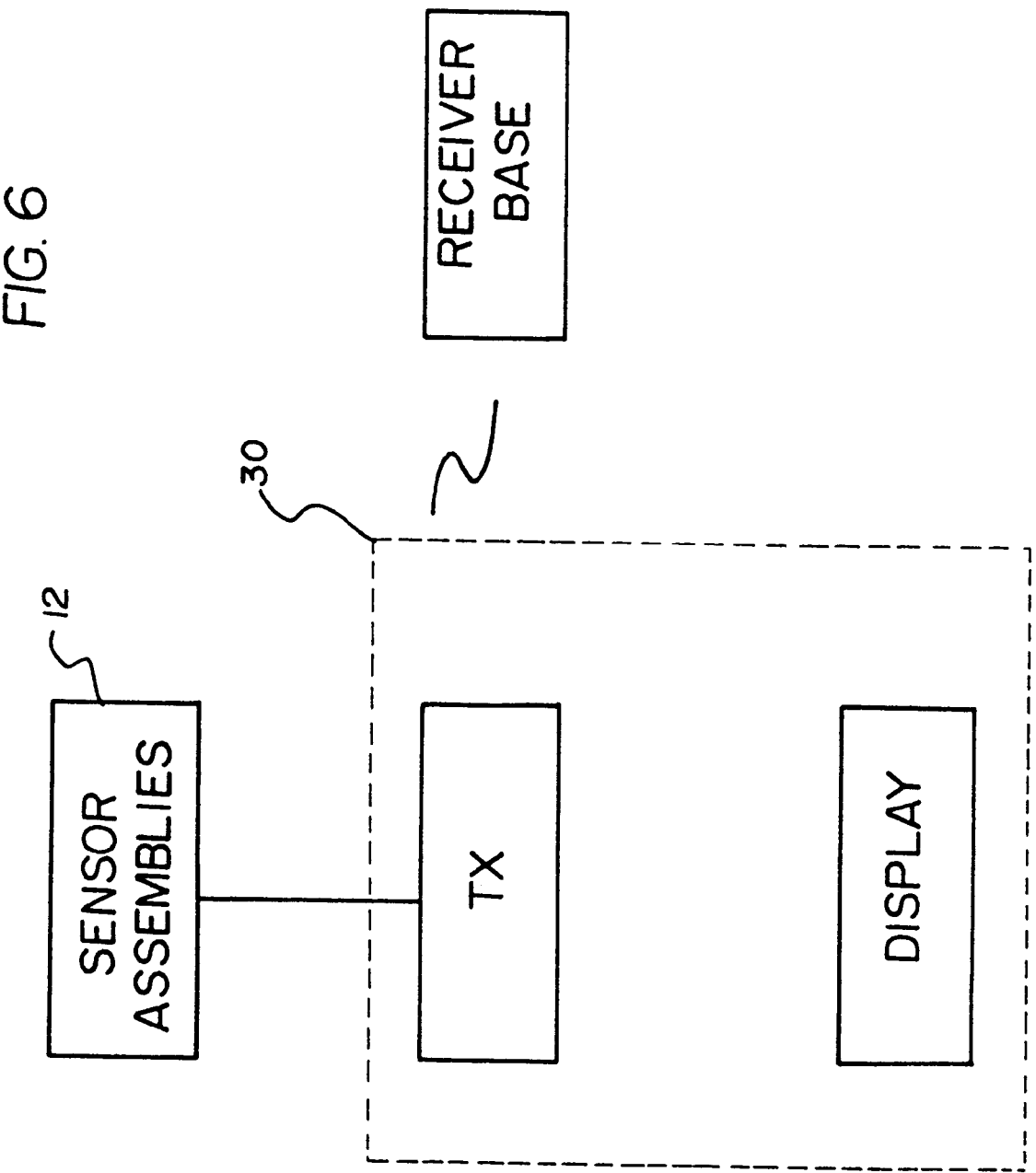

VEHICULAR ACCIDENT LOCATOR AND IDENTIFICATION SYSTEM

BACKGROUND OF THE INVENTION

1. Field of the Invention

The present invention relates to vehicle locators and more particularly pertains to a new vehicular accident locator and identification system for initiating the transmission of a coded signal upon the breaking of one of a plurality of brittle conductive elements situated throughout a body of a vehicle.

2. Description of the Prior Art

The use of vehicle locators is known in the prior art. More specifically, vehicle locators heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle locators include U.S. Pat. Nos. 5,311,197; 4,717,904; Des. 331,717; 5,119,102; 4,740,792; and 5,014,206.

In these respects, the vehicular accident locator and identification system according to the present invention substantially departs from the conventional concepts and designs of the prior art, and in so doing provides an apparatus primarily developed for the purpose of initiating the transmission of a coded signal upon the breaking of one of a plurality of brittle conductive elements situated throughout a body of a vehicle.

SUMMARY OF THE INVENTION

In view of the foregoing disadvantages inherent in the known types of vehicle locators now present in the prior art, the present invention provides a new vehicular accident locator and identification system construction wherein the same can be utilized for initiating the transmission of a coded signal upon the breaking of one of a plurality of brittle conductive elements situated throughout a body of a vehicle.

The general purpose of the present invention, which will be described subsequently in greater detail, is to provide a new vehicular accident locator and identification system apparatus and method which has many of the advantages of the vehicle locators mentioned heretofore and many novel features that result in a new vehicular accident locator and identification system which is not anticipated, rendered obvious, suggested, or even implied by any of the prior art vehicle locators either alone or in any combination thereof.

To attain this, the present invention generally comprises a plurality of sensor assemblies each including an elastomeric disk. Such disk is designed by a front face, a rear face, and a periphery formed therebetween defining an interior space. The front face has an adhesive lining situated thereon for adhering the same to an inner surface of a body of a vehicle. An elongated protrusion with a triangular cross-section integrally is formed on the rear face within the interior space. A pair of stanchions are coupled to the rear face within the interior space and extend toward the front face. Mounted on ends of the stanchions is a brittle conductive element. In its operative orientation, the brittle conductive element is situated in perpendicular relationship with the protrusion and further spaced therefrom. The sensor assemblies are mounted throughout the body and the elements thereof connected in series via insulated wires. As such, an activation signal is transmitted upon the breaking of any one of the elements by way of an accident. Next provided is a transmitter housing situated on a dash of the vehicle with a display situated thereon. The display provides a first indication upon the lack of receipt of power and further provides a second indication upon the receipt of the activation signal. The transmitter housing further has transmitter means connected to the elements of the sensor assemblies for transmitting a coded signal upon receipt of the activation signal. Lastly, a receiver base is positioned distant the vehicle and adapted to receive the coded signal to identify the vehicle associated therewith. The receiver base is further adapted to triangulate the exact location of the vehicle such that an emergency vehicle may be dispatched.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular accident locator and identification system apparatus and method which has many of the advantages of the vehicle locators mentioned heretofore and many novel features that result in a new vehicular accident locator and identification system which is not anticipated, rendered obvious, suggested, or even implied by any of the prior art vehicle locators, either alone or in any combination thereof.

It is another object of the present invention to provide a new vehicular accident locator and identification system which may be easily and efficiently manufactured and marketed.

It is a further object of the present invention to provide a new vehicular accident locator and identification system which is of a durable and reliable construction.

An even further object of the present invention is to provide a new vehicular accident locator and identification system which is susceptible of a low cost of manufacture with regard to both materials and labor, and which accordingly is then susceptible of low prices of sale to the consuming public, thereby making such vehicular accident locator and identification system economically available to the buying public.

Still yet another object of the present invention is to provide a new vehicular accident locator and identification system which provides in the apparatuses and methods of the prior art some of the advantages thereof, while simultaneously overcoming some of the disadvantages normally associated therewith.

Still another object of the present invention is to provide a new vehicular accident locator and identification system for initiating the transmission of a coded signal upon the breaking of one of a plurality of brittle conductive elements situated throughout a body of a vehicle.

Even still another object of the present invention is to provide a new vehicular accident locator and identification system that includes a brittle conductive element. The sensor assemblies are mounted throughout the body and the elements thereof are connected in series via insulated wires. As such, an activation signal is transmitted upon the breaking of any one of the elements by way of an accident. A transmitter housing has a transmitter connected to the elements of the sensor assemblies for transmitting a coded signal upon receipt of the activation signal. Finally, a receiver base is positioned distant the vehicle and adapted to receive the coded signal to triangulate the exact location of the vehicle such that an emergency vehicle may be dispatched.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a schematic showing the transmitter housing, display, and receiver base of the present invention.

DESCRIPTION OF THE PREFERRED EMBODIMENT

Figure 1:
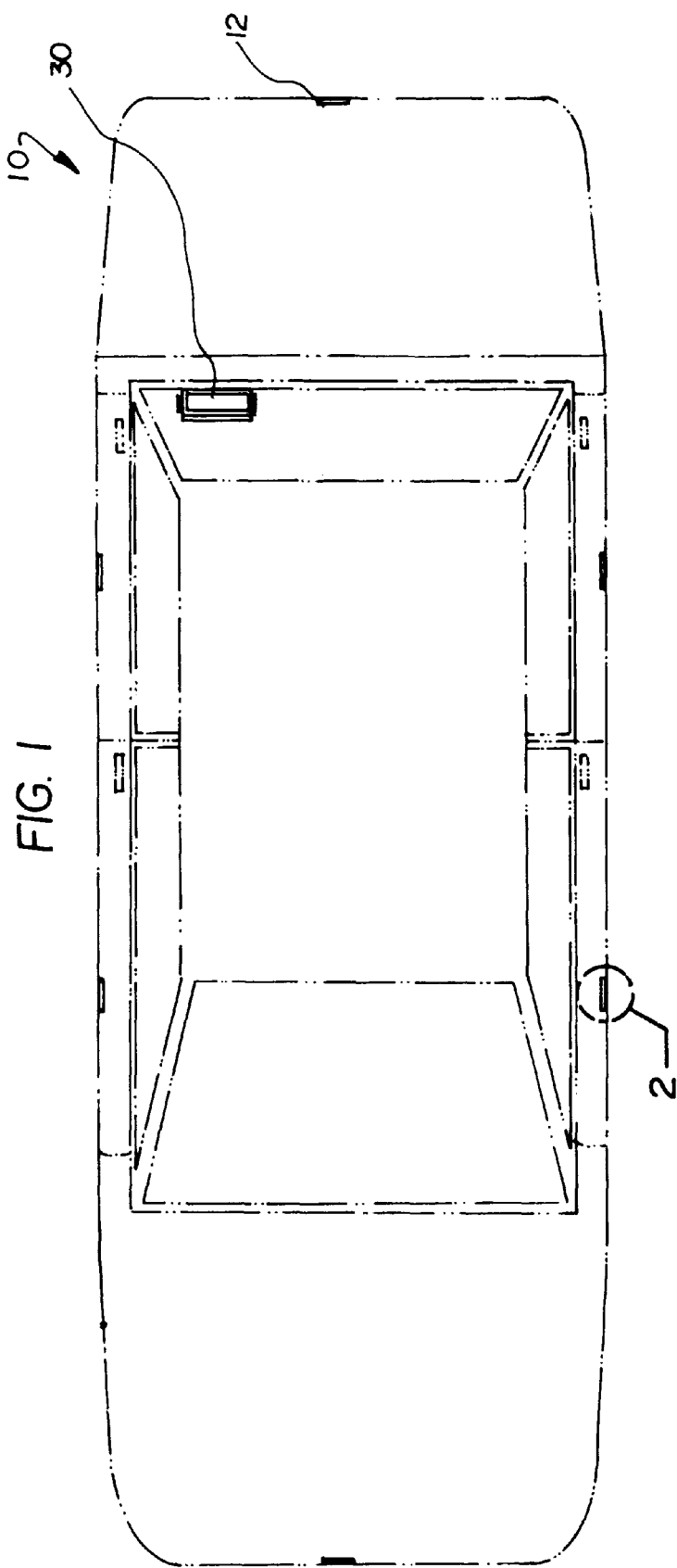
FIG. 1 is a top view of a new vehicular accident locator and identification system according to the present invention.
Figure 2:
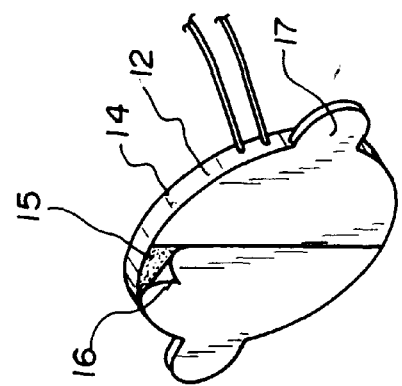
FIG. 2 is a perspective view of one of the sensor assemblies of the present invention.
Figure 3:
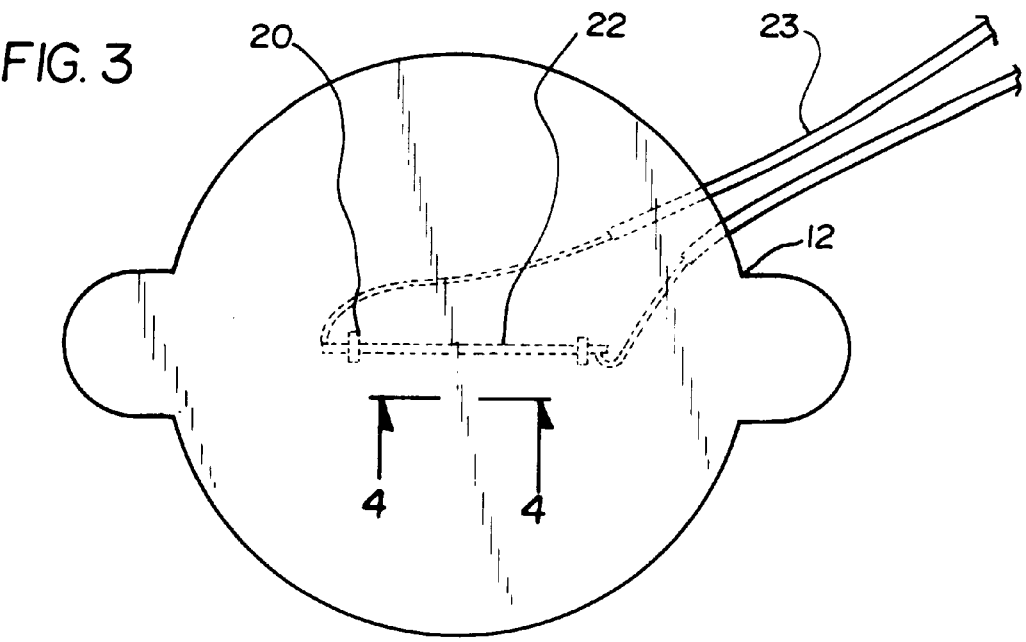
FIG. 3 is a top view of the sensor assembly of the present invention.
Figure 4:
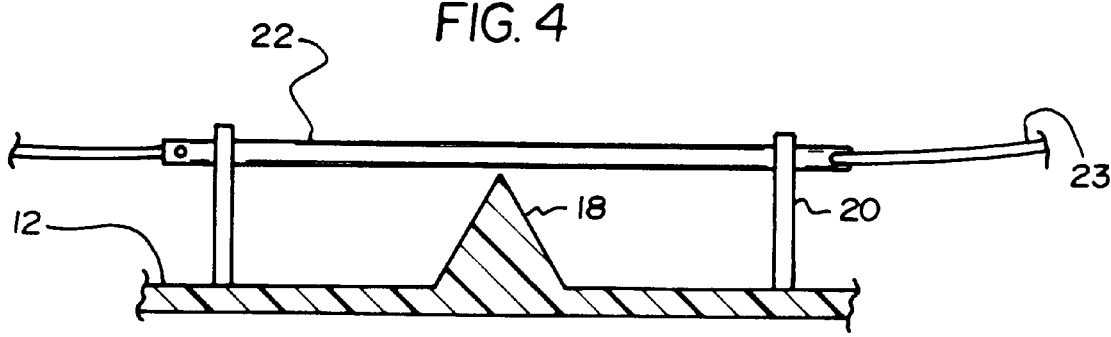
FIG. 4 is a cross-sectional view of the present invention taken along line 4—4 shown in FIG. 3.
Figure 5:
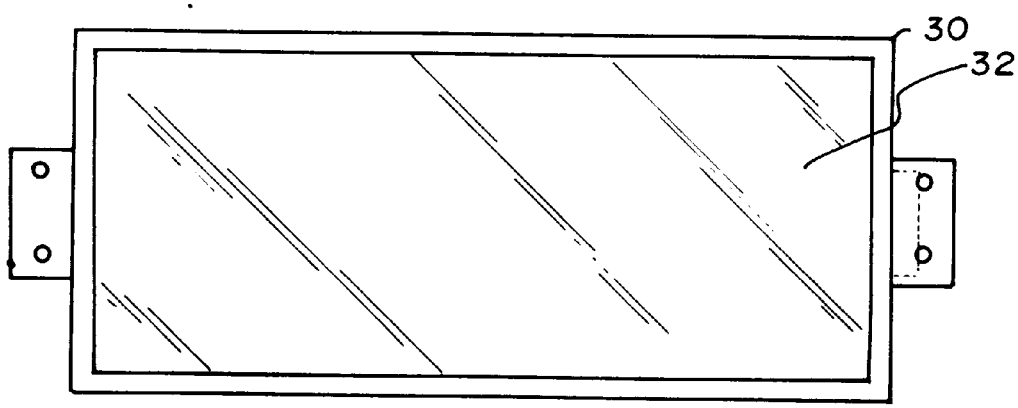
FIG. 5 is a top view of the transmitter housing of the present invention.

With reference now to the drawings, and in particular to FIGS. 1 through 5 thereof, a new vehicular accident locator and identification system embodying the principles and concepts of the present invention and generally designated by the reference numeral 10 will be described.

The present invention, as designated as numeral 10, includes a plurality of sensor assemblies 12 each including an elastomeric disk 14. Such disk is designed by a front face, a rear face, and a periphery formed therebetween defining an interior space. The front face has an adhesive lining 15 situated thereon for adhering the same to an inner surface of a body of a vehicle. A waxed paper backing 16 may be employed to protect the adhesive prior to use. Ears 17 may be formed on diametrically opposite sides of the disk for facilitating mounting the same on the vehicle. An elongated protrusion 18 with a triangular cross-section integrally is formed on the rear face within the interior space. A pair of stanchions 20 are coupled to the rear face within the interior space and extend toward the front face.

Mounted on ends of the stanchions is a brittle conductive element 22. Preferably, the brittle conductive element comprises a cylindrical fuse with a glass encasing. In its operative orientation, the brittle conductive element is situated in perpendicular relationship with the protrusion and further spaced therefrom. The sensor assemblies are mounted throughout the body of the vehicle and the elements thereof are connected in series via insulated wires 23. As shown in FIG. 1, a sensor assembly is situated on each door panel and the front and rear of the vehicle. As such, an activation signal is transmitted upon the breaking of any one of the elements by way of an accident.

Next provided is a transmitter housing 30 situated on a dash of the vehicle with a display 32 positioned thereon. The display provides a first indication upon the lack of receipt of power. Such indication preferably takes the form of a visual light. The display further provides a second indication upon the receipt of the activation signal. Such indication preferably takes the form of the illumination of indicia which takes the form of the word "HELP" or the like. The transmitter housing further has transmitter means connected to the elements of the sensor assemblies for transmitting a coded signal via free space upon receipt of the activation signal. It is imperative that the coded signal be a string of 1's and 0's which is unique to the vehicle. To prevent tampering, the transmitter continues transmission of the coded signal unconditionally until battery power is depleted.

Lastly, a receiver base is positioned distant the vehicle and adapted to receive the coded signal to identify the vehicle associated therewith. The receiver base is further adapted to triangulate the exact location of the vehicle such that an emergency vehicle may be dispatched. In the alternative, a global positioning system (GPS) may be employed to accomplish the same.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular accident indication and locator system comprising, in combination:

a vehicle having a body and an interior compartment having a dash;

a plurality of sensor assemblies each including an elastomeric disk having a front face, a rear face, and a periphery formed therebetween defining an interior space, the front face having an adhesive lining situated thereon for adhering the same to an inner surface of the body of the vehicle, ears formed on diametrically opposed sides of the disk for facilitating mounting, an elongated protrusion with a triangular cross-section integrally formed on the rear face within the interior space, a pair of stanchions coupled to the rear face within the interior space and extending toward the front face, a brittle conductive element comprising a fuse with a glass casing having a pair of ends mounted on ends of the stanchions such that the element is situated in perpendicular relationship with the protrusion and further spaced therefrom, the sensor assemblies being mounted throughout the body of the vehicle and the elements thereof being connected in series via insulated wires such that an activation signal is transmitted upon the breaking of any one of the elements by way of an accident;

a transmitter housing situated on the dash of the vehicle with a display situated thereon, the display adapted to provide a first indication in the form of a visual light upon the lack of receipt of power and further provide a second indication in the form of a visual light having the shape of a word upon the receipt of the activation signal, the transmitter housing further having transmitter means connected to the elements of the sensor assemblies for transmitting a coded signal unique to the vehicle upon receipt of the activation signal wherein the, transmitter means continues transmission of the coded signal unconditionally until power is depleted; and a receiver base positioned remote from the vehicle and adapted to receive the coded signal to identify the vehicle associated therewith and further triangulate the exact location of the vehicle such that an emergency vehicle may be dispatched.

2. A vehicular accident indication and locator system comprising, in combination:

a plurality of sensor assemblies each including a brittle conductive element, the sensor assemblies adapted for being mounted throughout a body of a vehicle such that an activation signal is transmitted upon the breaking of any one of the elements by way of an object impacting against the body of the vehicle;

a transmitter housing adapted for being situated on a dash of the vehicle, the housing having a display situated thereon, the display adapted to provide a first indication in the form of a visual light upon the lack of receipt of power and further provide a second indication in the form of a visual light upon the receipt of the activation signal, the transmitter housing further having transmitter means connected to the elements of the sensor assemblies for transmitting a coded signal unique to the vehicle upon receipt of the activation signal; and a receiver base positionable remotely from the transmitter housing and adapted to receive the coded signal to identify the vehicle associated therewith and further identify the exact location of the vehicle such that an emergency vehicle may be dispatched.

3. A vehicular accident indication and locator system as set forth in claim 2 wherein the plurality of sensor assemblies each include an elastomeric disk having a front face, a rear face, and a periphery formed therebetween defining an interior space, the front face having an adhesive lining situated thereon and adapted for adhering the same to an inner surface of a body of a vehicle, ears formed on diametrically opposed sides of the disk for facilitating mounting, an elongated protrusion with a triangular cross-section integrally formed on the rear face within the interior space, a pair of stanchions coupled to the rear face within the interior space and extending toward the front face, a brittle conductive element having a pair of ends mounted on ends of the stanchions such that the element is situated in perpendicular relationship with the protrusion and further spaced therefrom, the sensor assemblies adapted for being mounted throughout the body and the elements thereof connected in series via insulated wires.

\* \* \* \* \*